United States Patent
Lamla et al.

[11] Patent Number: 5,850,524
[45] Date of Patent: Dec. 15, 1998

[54] METHOD FOR TESTING THE AUTHENTICITY OF A DATA CARRIER

[75] Inventors: Michael Lamla; Wolfgang Rankl; Franz Weikmann, all of München; Wolfgang Effing, Gilching, all of Germany

[73] Assignee: Giesecke & Devrient GmbH, München, Germany

[21] Appl. No.: 591,580

[22] PCT Filed: Jun. 2, 1995

[86] PCT No.: PCT/EP95/02104

§ 371 Date: Jul. 15, 1996

§ 102(e) Date: Jul. 15, 1996

[87] PCT Pub. No.: WO95/34054

PCT Pub. Date: Dec. 14, 1995

[30] Foreign Application Priority Data

Jun. 6, 1994 [DE] Germany ............................ 44 19 805.1

[51] Int. Cl.$^6$ .................................................. G01R 31/00
[52] U.S. Cl. ...................... 395/200.61; 395/284; 395/285

[58] Field of Search ......................... 395/200.09, 182.03, 395/182.19, 183.12, 183.2, 200.61, 200.6, 284, 285, 286; 364/514 B, 551.01; 371/20.1, 67.1, 68.2, 71

[56] References Cited

U.S. PATENT DOCUMENTS 5,148,435  9/1992  Ray, Jr. et al. ......................... 371/20.5
5,612,961  3/1997  Cabezas et al. ........................ 371/20.4

Primary Examiner—Thomas Peeso
Attorney, Agent, or Firm—Bacon & Thomas

[57] ABSTRACT

A method for testing the authenticity of a data carrier having at least an integrated circuit with memory units and logic units as well as a data line for data exchange with an external device. The invention is characterized in that the integrated circuit additionally has a separate hard-wired circuit for transmitting and/or receiving data during the power-up sequence, which is used for authenticity testing, the first transmission or reception of data being completed within a defined time domain of the power-up sequence in which the data line has no defined state.

26 Claims, 9 Drawing Sheets

METHOD FOR TESTING THE AUTHENTICITY OF A DATA CARRIER

BACKGROUND OF THE INVENTION

1. Field of the Invention

This invention relates to a method for testing the authenticity of a data carrier according to the preamble of claim 1. The invention relates further to a data carrier assembly for carrying out the method.

2. Description of Related Art

A method for authenticity testing is known e.g. from EP-A1 0 321 728. In the known method the data carrier is switched by a control signal transmitted by an external device from the normal mode to the checking mode in which authenticity testing takes place. For this purpose the data carrier has an additional switching logic which performs this switch-over in accordance with the external signal. In the checking mode the data carrier is then fed checking data from outside which are processed by an additional electronic circuit, e.g. in the form of an analog computer. The time the analog computer takes to process the checking data constitutes an authenticity feature for the data carrier. In the known method the authenticity testing occurring in the checking mode of the data carrier is decoupled from the normal mode so that the normal mode, which as a rule follows standardized protocols, is not disturbed by the authenticity testing. However this means that a switch-over by means of the additional switching logic from the normal mode to the checking mode is necessary before each authenticity testing.

SUMMARY OF THE INVENTION

The objective of the invention is to propose a method for testing the authenticity of a data carrier wherein the authenticity testing is compatible with existing standardized protocols and can be done with low circuit complexity.

This problem is solved by the features stated in claim 1.

The basic idea of the invention is that the first transmission or receptinon of data used for authenticity testing occurs during the power-up sequence for the data carrier in which the data line has as yet no defined state for data exchange with an external device. For example the data line can be in an undefined state for a defined time domain during the power-up sequence according to the standard ISO/IEC 7816-3. Since the first transmission or reception of data is completed within the time domain defined by the standard, the data exchange standardized for communication with chip cards is not disturbed. The test procedure can therefore take place according to the invention with existing protocols conforming to standards.

The data carrier has an additional special circuit which transmits to, or receives from, an external device the data required for authenticity testing within said time domain for which the data line need have no state defined by the protocol.

In a first embodiment e.g. an identification of the data carrier realized in hardware can be transmitted to the external device within said time domain. The external device, e.g. card reading device, likewise has a special circuit permitting reception of the data transmitted by the card within this time domain so that the device can perform authenticity testing. But even if the device has no such special circuit and is thus not in a position to receive the data transmitted by the card within said time, the communication protocol is not disturbed by transmission of the data. Therefore no errors can occur in the protocol run when the card communicates with a conventional device within this time.

According to a development the special circuit located on the integrated circuit of the data carrier can also generate a random number within said time domain which is then logically combined with the data carrier identification by the special switching logic of the data carrier, the result of combination being transmitted from the data carrier to the external device within said time domain, but at the latest in the answer-to-reset signal (ATR). The use of a random number makes a replay attack impossible, i.e. replay of tie previously transmitted data.

In a further embodiment the external device, e.g. card reading device, can also have an additional circuit which serves to generate the random number. The random number is then preferably transmitted to the data carrier in synchronism to the clock signal within said time domain because of the higher transfer rate. The special additional circuit of the data carrier is in a position to receive the transmitted random number within said time domain for which the contact element need have no defined state, and to transmit at least part of the received random number back to the external device within this time. As an extension of this, the special switching logic of the data carrier can also logically combine the received random number with the data carrier identification and transmit the result of combination back to the external device within said time domain or at the latest in the ATR signal to acknowledge reception of the random number. The external device can then use the result of combination received from the data carrier to check whether the data carrier is detectably capable of receiving the transmitted random number within said time domain and combining it correctly with the data carrier identification and transmitting it to the external device within a predetermined time. The presence of the result of combination in the ATR signal constitutes a class identification for the data carrier and can be evaluated as such by the external device, whereas the content of the result of combination constitutes an identification specific to the data carrier.

BRIEF DESCRIPTION OF THE DRAWINGS

Further advantages and advantageous developments can be found in the description of the invention with reference to the figures, in which.

DETAILED DESCRIPTION OF THE PREFERRED EMBODIMENTS

Figure 1:
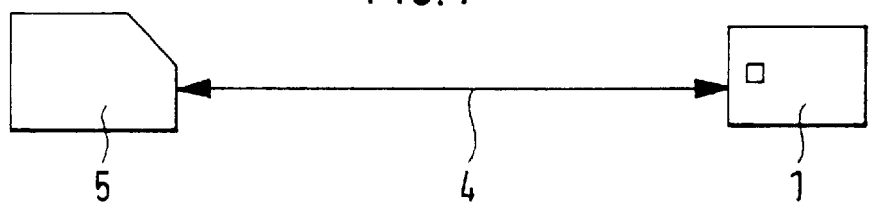
FIG. 1 shows a data carrier assembly for authenticity testing.

FIG. 1 shows a data carrier assembly for testing the authenticity of a data carrier in the form of chip card 1 which communicates via data line 4 with external device 5, e.g. a card reading device. The chip card can be a contacting chip card or a contactless chip card which communicates with the external device without contact.

Figure 2:
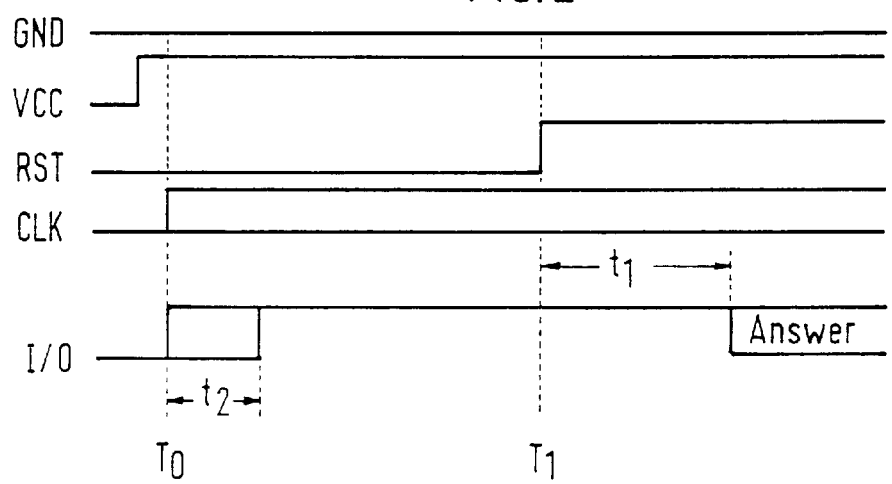
FIG. 2 shows the standardized signal pattern in the power-up sequence of the data carrier.

FIG. 2 shows the signal pattern upon a reset of the data carrier as is standardized e.g. in the international standard ISO/IEC 7816-3. One sees specifically ground potential GND, supply voltage VCC, reset signal RST fed externally for resetting the data carrier, clock signal CLK and data line I/O. When supply voltage is Applied and the voltage stabilized and the clock signal applied at time $T_c$, data I/O is in the receiving mode for reset signal RST provided by an external device at time $T_1$. As of time $T_0$ data line I/O can be in an undefined state for time domain $t_2$ according to said standard. According to the standard time domain $t_2$ must be smaller than or equal to 200 clock cycles divided by clocking rate $f_i$. When this time has elapsed data line I/O must be in a defined state and can therefore not be used for transmitting or receiving data before reset signal RST. Upon receiving reset signal RST at time $T_1$ the data carrier answers with answer-to-reset signal ATR after time period $t_1$.

Figure 3A:
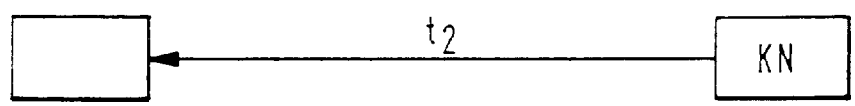
FIGS. 3a to 3c show an embodiment of the inventive test procedure wherein the data carrier transmits the data, FIGS. 4 and 5 each show an embodiment of the inventive method wherein the data are transmitted by an external device and received by the data carrier.

FIG. 3a shows the first transmission process, e.g. the transmission of identification KN of the data carrier, by the latter to an external device within time domain $t_2$. As soon as clock signal CLK is applied the data carrier automatically transmits the identification, e.g. serial number, directly to the external device preferably in synchronism to the clock signal. Synchronous transmission permits a higher transmitting rate than asynchronous transmission. The serial number could of course also be transmitted in asynchronism to the clock signal if this can be done within time domain $t_2$. In any case the data carrier has not only the usual logic and memory units but also a special circuit which permits this fast transmission within the stated time period. With a standard command the external device can then read out the serial number stored in a memory in the data carrier and compare it with the serial number received from the data carrier. If the serial number transmitted by the data carrier by means of the special circuit matches the one read out of the data carrier memory, the data carrier is detectably capable of transmitting the data necessary for authenticity testing very fast within time domain $t_2$. This property is an authenticity feature which can be fulfilled by no conventional data carrier, i.e. a data carrier without this special circuit.

Figure 3B:
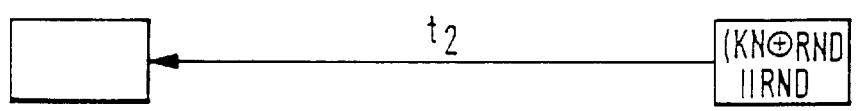
Figure 3C:

The method step shown in FIG. 3b is an extension of the method according to FIG. 3a. Identification KN is combined e.g. by exclusive-OR with random number RND generated by the data carrier, the result of combination with generated random number RND being transmitted to the external device. The random number is generated within time domain $t_2$. The result of combination with random number RND is preferably likewise transmitted within time period $t_2$. However it is also possible, as shown in FIG. 3c, to transmit the result of combination and the random number in the answer-to-reset signal of the data carrier e.g. in the historical characters of the ATR signal. The external device can then in a later authentication step, according to the normal protocol run, combine the received random number with identification KN read out of a memory in the data carrier by the same logical operation again and compare the result of combination with the result of combination from the data carrier transmitted in the ATR signal. The use of a random number makes a replay attack impossible, i.e. an attack by replaying the previously recorded data.

Figure 4:
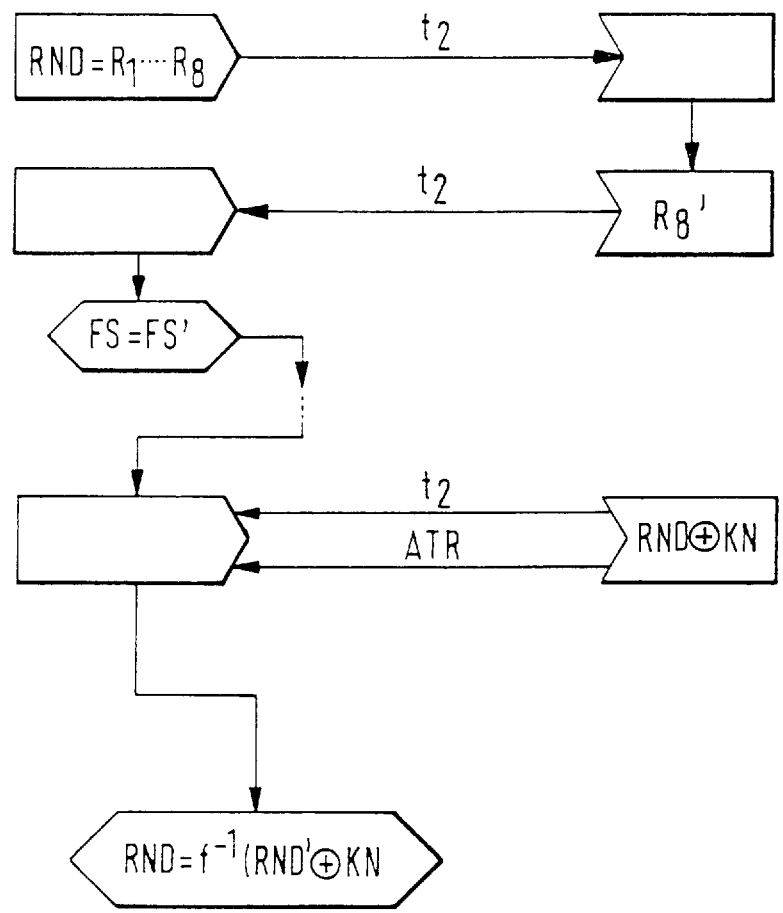

FIG. 4 shows a further embodiment of the inventive method. In a first method step the external device transmits random number RND, which can include e.g. 8 bytes, to the data carrier within time period $t_2$. Transmission preferably takes place in synchronism to the clock signal but can also be asynchronous. Within time period $t_2$ the data carrier transmits at least last byte $R_8'$ of the received random number back to the external device. The external device then compares last byte $R_8$ of the random number generated by it with byte $R_8'$ received from the data carrier. If they match, the data carrier was able to receive the transmitted random number correctly and transmit at least part back. The fact that the data carrier can receive data very fast is an authenticity feature. The data carrier can of course also transmit the entire random number received within period $t_2$ back to the external device, rather than the last byte of the random number. This can also take place for example in the ATR signal.

In addition random number RND received from the external device within time period $t_2$ can be combined by a logical operation with data carrier identification KN by the special switching logic of the data carrier. As a logical operation one can use e.g. a polynomial modulo division with the identification as the divisor polynomial for the random number. This logical operation is familiar to the expert and will therefore not be described more closely here. Identification KN combined in such a way with the random number of the data carrier can then be transmitted to the external device within time period $t_2$ or in the ATR signal of the data carrier. Both variants are conceivable here. The external device then obtains the random number received by the data carrier from the result of combination of random number and identification again by executing an inverse function to the logical operation and compares it with the random number generated by the external device. If they match this shows that the data carrier, in particular the special circuit of the data carrier, is detectably capable of receiving and combining the random number very fast and transmitting the result of combination to the external device within $t_2$ or at the latest in the ATR signal of the data carrier, e.g. in the historical characters.

Figure 5:
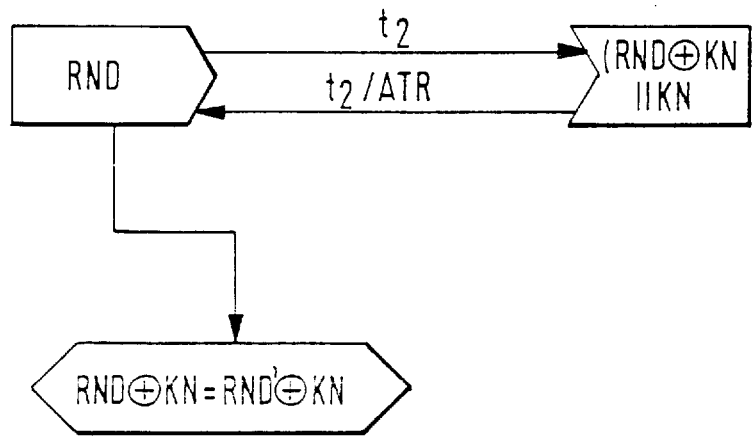

FIG. 5 shows a further embodiment in which random number RND transmitted by the external device, which can include e.g. several bytes, is received by the data carrier within time period $t_2$, whereby either the whole random number or at least the last byte of the transmitted random number, depending on the length of the random number, is combined with data carrier identification KN by exclusive-OR, the result of combination being transmitted to the external device jointly with the data carrier identification within time $t_2$ or in the ATR signal. The external device then performs the same logical operation again starting out from received identification KN and generated random number RND and compares the result of combination obtained by the external device with the result of combination received from the data carrier.

The statements on FIGS. 3 to 5 show that for testing the authenticity feature of the data carrier the external device must perform operations going beyond normal communication between the external device and the data carrier. For example the external device transmits to the data carrier a random number which is logically combined with an identification there, as described above, and the result of logical combination is checked in the external device.

It is possible to design the microprocessor unit of the external device right from the start so that it can perform the operations necessary for testing the authenticity feature of the data carrier. In external devices already in service the microprocessor unit is not formed in this way. If they are nevertheless to be used for testing the authenticity feature of the data carrier it is especially advantageous to provide the external device subsequently with a safety module for performing the testing, in addition to its microprocessor unit. Many external devices already in service are provided with at least one additional outlet for at least one additional module so that special adaptation of the external device is unnecessary. These outlets are not readily accessible from outside, so that there is also no safety problem in housing the functions necessary for testing the authenticity feature in a separate safety module.

In an especially advantageous embodiment the safety module can be formed, like the data carrier, as a chip card, which is preferably formed as a plug-in (that is, a chip card with smaller dimensions than a standard chip card) because of the spatial confinement in most external devices.

Figure 6:
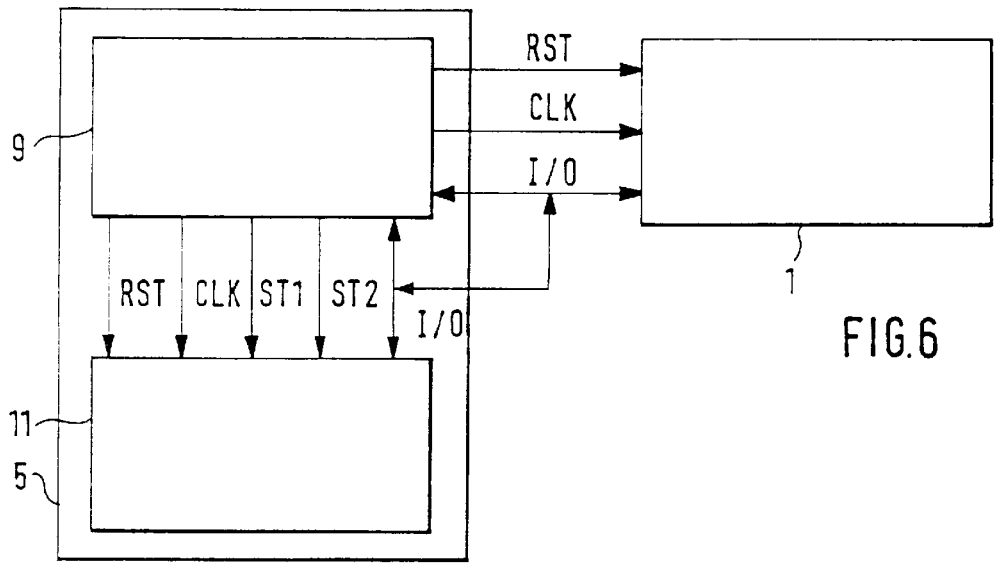
FIG. 6 shows a data carrier assembly consisting of an external device and a data carrier for testing the authenticity of the data carrier.

FIG. 6 shows schematically a data carrier assembly for testing the authenticity of a data carrier in the form of chip card 1 which communicates with external device 5. One sees only the connecting lines between the components which are necessary for understanding the following statements. External device 5 has, among other things microprocessor unit 9 and safety module 11. For communication between data carrier 1 and external device 5, microprocessor unit 9 is first switched on, then recognizing that a data carrier is located in external device 5. Safety module 11 is then switched on by microprocessor unit 9 and requested to test the authenticity feature of data carrier 1. This can be done for example via control lines ST1 and ST2 to which a defined signal is applied which corresponds to the request, e.g. a logical 1 on control line ST1 and on control line ST2. A random number is then generated in safety module 11, first being stored in safety module 11 after a request by microprocessor unit 9. The request can be issued for example again via control lines ST1 and ST2 to which a defined signal is again applied, e.g. a logical 0 on control line ST1 and a logical 1 on line ST2.

After the random number is stored in safety module 11 data carrier 1 is switched on by microprocessor unit 9, as explained above in connection with FIG. 2. When supply voltage is applied to data carrier 1, the voltage stabilized and the clock signal applied to data carrier 1 at time $T_0$, data line I/O to data carrier 1 is in the receiving mode for reset signal RST fed to the data carrier by microprocessor unit 9. As of time $T_0$ data line I/O leading to data carrier 1 can be in an undefined state for time domain $t_2$, as described above in connection with FIG. 2. Time domain $t_2$ is used to test the authenticity feature of data carrier 1 with the help of safety module 11.

For this purpose safety module 11 transmits the above-mentioned stored random number to data carrier 1 via I/O after data carrier 1 is switched on and a request is made by microprocessor unit 9. The request to transmit the random number can again be made via control lines ST1 and ST2 to which a defined signal is applied which corresponds to the request (e.g. a logical 1 on control line ST1 and a logical 0 on control line ST2).

In data carrier 1 the transmitted random number is logically combined with identification KN within time domain $t_2$ and the result of combination transmitted by data carrier 1 along with identification KN back to safety module 11 of external device 5.

In safety module 11 transmitted identification KN is likewise logically combined with the random number just as in data carrier 1 and the result of combination compared with the result transmitted by the data carrier. Matching results prove that data carrier 1 is authentic. A corresponding message is transmitted by safety module 11 to microprocessor unit 9, which then begins with the actual communication between external device 5 and data carrier 1.

Although the authenticity feature testing described in connection with FIG. 6 was virtually like that explained above in connection with FIG. 4, safety module 11 can naturally also be used to perform any differently designed authenticity tests (see e.g. FIG. 3 and FIG. 5). Safety module 11 should then be adapted to the particular authenticity feature of data carrier 1.

Figure 7:
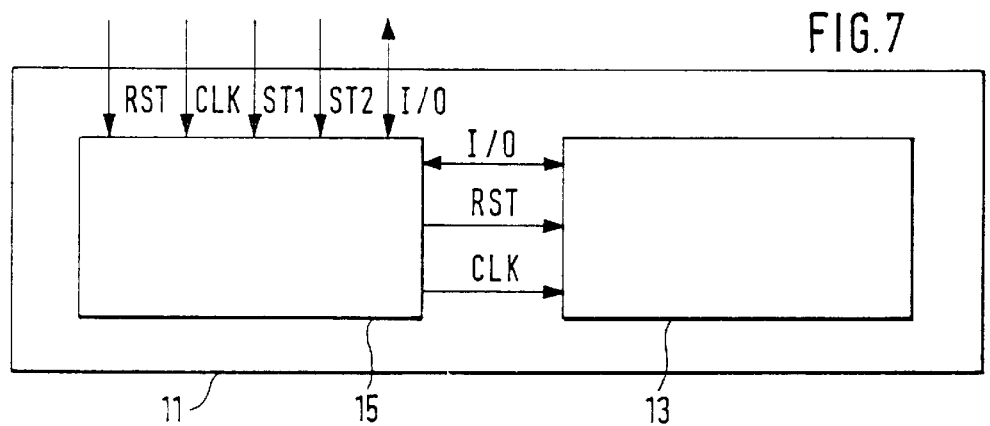
FIG. 7 shows a safety module which is part of the external device and used for performing authenticity testing.

FIG. 7 shows a schematic view of how safety module 11 can be constructed for example. Like FIG. 6, FIG. 7 shows only the connecting lines between the individual components which are necessary for understanding. In the embodiment shown, safety module 11 has standard microprocessor unit 13 formed as a separate integrated circuit. Furthermore safety module 11 has further integrated circuit 15 connected with standard microprocessor unit 13. Integrated circuit 15 has a structure as simple as possible so that it can be driven quickly and easily and test the authenticity feature of data carrier 1 (not shown) quickly.

Integrated circuit 15 preferably has a hard-wired logic which can be controlled quickly and easily by microprocessor unit 9 via control lines ST1 and ST2 (cf. also FIG. 6). The following control signals can be specified for example:

control line ST1 logical 0, control line ST2 Logical 0 means: authenticity feature should not be tested, control line ST1 logical 1, control line ST2 logical 1 means: authenticity feature should be tested, control line ST1 logical 0, control line ST2 logical 1 means: a random number generated in safety module 11 should first be stored in registers of integrated circuit 15 (cf. also FIG. 6), control line ST1 logical 1, control line ST2 logical 0 means: the above register content, i.e. the random number, should be transmitted to the data carrier (cf. also FIG. 6).

The two control lines ST1 and ST2 thus allow complete control of integrated circuit 15 and thus external control of safety module 11.

In the following the internal communication between integrated circuit 15 and standard microprocessor unit 13 will be discussed. After integrated circuit 15 is requested by microprocessor unit 9 to test the authenticity feature of the data carrier, integrated circuit 15 switches on standard microprocessor unit 13 according to the power-up sequence conforming to ISO (ISO/IEC 7816-3). The power-up sequence is known to the expert and furthermore explained briefly above in connection with FIG. 2 so that it need not be discussed more closely here.

Standard microprocessor unit 13 then generates a random number which is transmitted to integrated circuit 15 and stored in the abovementioned register there. The stored random number is transmitted to data carrier 1 after a request by microprocessor unit 9 (see above), and logically combined there as explained above in connection with FIG. 6.

Data carrier 1 then transmits the information necessary for testing the authenticity feature to safety module 11, as likewise explained above in connection with FIG. 6. The transmitted information is stored in temporary registers of integrated circuit 15. Standard microprocessor 13 then requests the stored information from integrated circuit 15 and checks the derived random number (see above).

It was explained in connection with FIG. 7 that safety module 11 has two integrated circuits which perform the stated functions. It is obviously also possible to combine the two integrated circuits in one integrated circuit or to provide an integrated circuit with a microprocessor unit which is driven as usual by certain commands from microprocessor unit 9 and tests the authenticity feature independently. However such drive by microprocessor commands is as a rule more time-consuming than the abovementioned control of integrated circuit 15 via control lines ST1 and ST2.

Figure 7A:
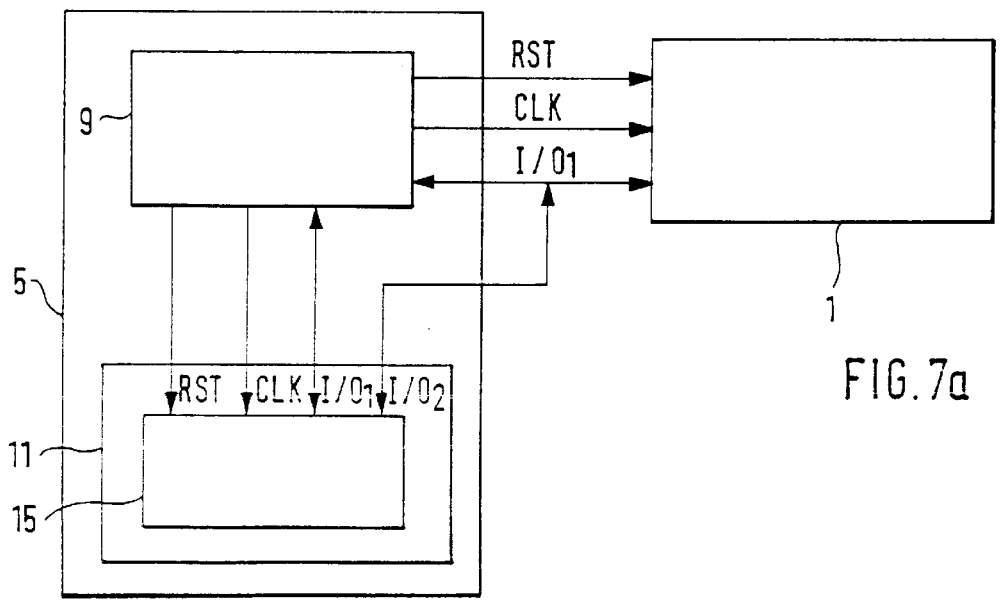
FIG. 7a shows a data carrier assembly consisting of an external device and a data carrier for testing the authenticity of the data carrier.

An embodiment in which safety module 11 has only one integrated circuit is shown in FIG. 7a. The integrated circuit has a microprocessor unit formed so that it can perform the functions necessary for testing the authenticity feature. Communication between microprocessor unit 9, safety module 11, external device 5 and data carrier 1 takes place virtually as described above in connection with FIG. 6, so that only the differences will be discussed in the following.

Integrated circuit 15 is driven by microprocessor unit 9 via $I/O_1$. The microprocessor commands necessary for testing the authenticity feature are thus transmitted via $I/O_1$. The corresponding commands were explained above in connection with FIG. 7. In the embodiment shown one can thus dispense with control lines ST1 and ST2 as are shown in FIG. 6.

The data transmitted to data carrier 1 by integrated circuit 15 of safety module 11 also correspond to the data transmitted in FIG. 6. These data can be transmitted from interface $I/O_2$ or integrated circuit 15, which is always present in commercial integrated circuits for chip cards, to interface $I/O_1$ of the data carrier. In this case the transmission paths of the commands from microprocessor unit 9 to integrated circuit 15 and of the data from integrated circuit 15 to data carrier 1 are separated from each other. It is obviously also possible to transmit the data from interface $I/O_1$ of integrated circuit 15 to interface $I/O_1$ of data carrier 1, as also shown in FIG. 6.

Figure 8A:
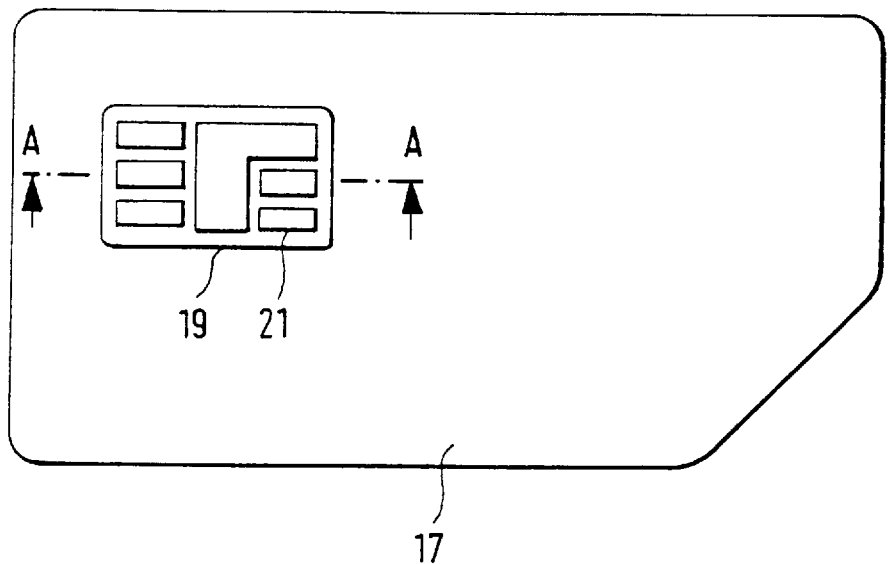
FIG. 8a shows a data carrier in which the safety module is housed.

FIG. 8a shows greatly enlarged and not true to scale plug-in card 17 in which safety module 11 is housed as electronic module 19. Mini chip card 17 is plugged in one of the abovementioned outlets in external device 5 so that the authenticity feature of data carrier 1 can now be tested with the help of card 17 (see FIG. 1).

Figure 8B:
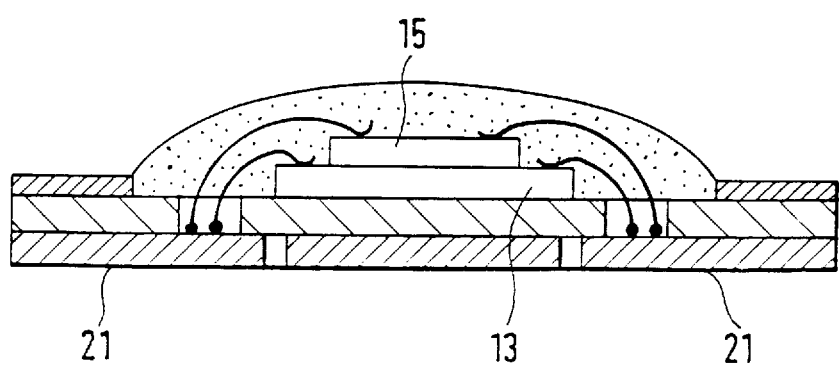
FIG. 8b shows a cross section through the electronic module of the data carrier from FIG. 8a, FIG. 9 shows a basic wiring diagram of the data carrier.

FIG. 8b shows likewise greatly enlarged and not true to scale a cross section through the electronic module along line AA shown in FIG. 8a. The structure of such electronic modules is known in the art (e.g. from EP 0 299 530 B1) so that it will not be explained more closely here. Electronic module 9 contains both standard microprocessor unit 13 and integrated circuit 15 which are both electrically connected with contact surfaces 21. The two integrated circuits are preferably superimposed, as shown in FIG. 8b, but can of course also be side by side. Both circuits can communicate after application of the corresponding voltages and signals via contact surfaces 21 with each other and with microprocessor unit 9. The communication sequence between the components has been described above.

Now that the communication between external device 5 and data carrier 1 and the internal communication within external device 5 have been explained, data carrier 1 itself will now be discussed.

Figure 9:
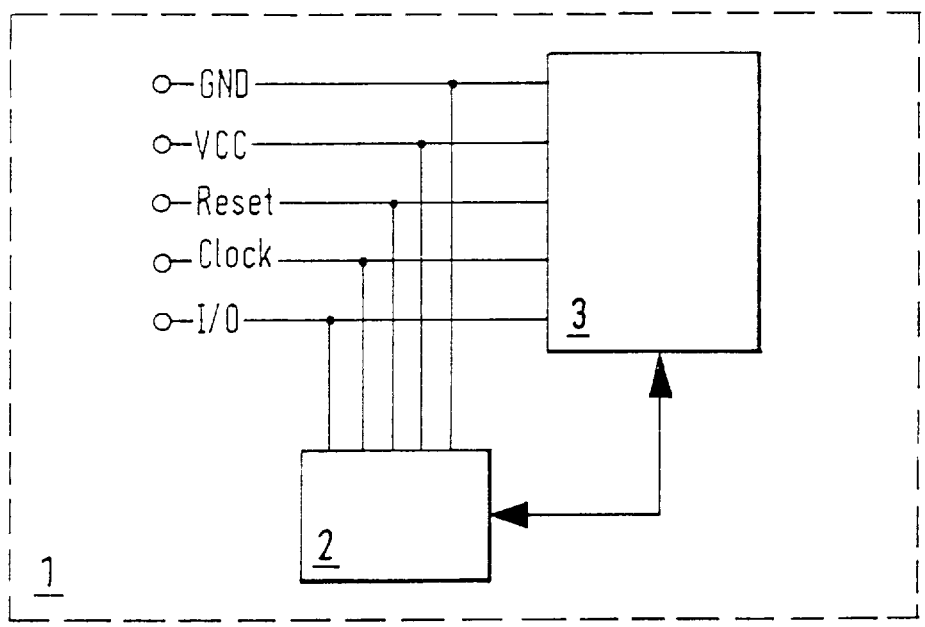

Data carrier 1 schematically shown in FIG. 9 differs from conventional data carriers, e.g. with a microprocessor, in that, in addition to usual microcontroller 3, special circuit 2 is provided for transmitting or receiving data and possibly combining the data with a data carrier identification realized in hardware, e.g. serial number. The data carrier identification can be realized e.g. during the production process of the integrated circuit by firing fuses as a hardware feature for the special circuit of the integrated circuit. The hardware realization of such an identification is described e.g. in the as yet unpublished patent application PCT/EP 93/03668. In addition to the embodiments described in this application the identification can also be provided e.g. by setting the fuses by means of a laser cutter in the wafer fabrication so that the fuses are set irreversibly in a defined logical state.

A further possibility of realizing the identification as hardware is to form certain areas of the silicon of the integrated circuit as amorphous silicon areas and to use these areas as fuses. The amorphous areas are nonconductive, but can be transformed into crystalline conductive silicon areas by sending a sufficiently high current through these areas. The unfired fuse is thus nonconductive and the fired fuse conductive. A particular advantage of forming the fuses for the identification as amorphous silicon areas is that amorphous silicon cannot be distinguished from crystalline silicon optically. The data carrier identification can thus not be spied out using optical methods.

Microcontroller 3 of the data carrier can also directly access special circuit 2 in the shown configuration. For example microcontroller 3 can read out the result of combination calculated by special switching logic 2 when the result calculated by special circuit 2 is to be transmitted to the external device as part of the ATR signal, e.g. in the historical characters. However special circuit 2 can also transmit the result of combination to the external device directly via data line I/O within time domain $t_2$ without assistance from microcontroller 3, since special circuit 2 is connected directly with GND, VCC, reset, clock and the I/O data line. This hardware configuration of the data carrier permits the fast transmission or reception of data and possibly the combination of the data with a data carrier identification to be performed within said time period $t_2$. Instead of the I/O line special circuit 2 can also be connected with one of the two RFU lines (reserved for future use) not shown. Installation of this special circuit as an authenticity feature for a data carrier prevents the authenticity testing method from being emulated or simulated by conventional data carriers, e.g. with a microprocessor, by the latter or by an external logic circuit.

Figure 10:
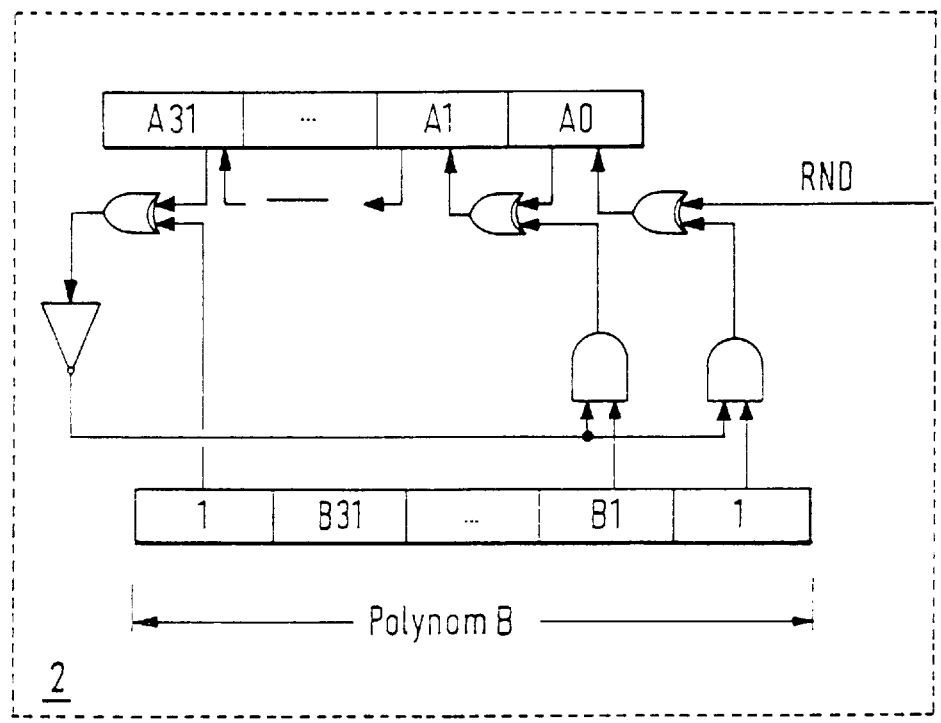
FIG. 10 shows an embodiment of a special circuit.

FIG. 10 shows the essential parts of data carrier special circuit 2 which is e.g. able to perform a polynomial modulo division of the random number with the data carrier identification as the divisor polynomial. Special circuit 2 includes e.g. 32 XORs, 32 ANDs, a NEG gate and shift register A. Furthermore the integrated circuit of the data carrier bears fuses (not shown) which are set e.g. by means of a laser cutter in a defined logical state during wafer fabrication. These fuses can be used e.g. to realize the identification as a hardware feature, further register B containing the combination of logical states of the set fuses. Random number RND transmitted by the external device is loaded into shift register A and the logic gates used to realize a polynomial modulo division of the bit positions of the random number in register A with register B which is determined by the data carrier identification, e.g. serial number.

Figure 11:
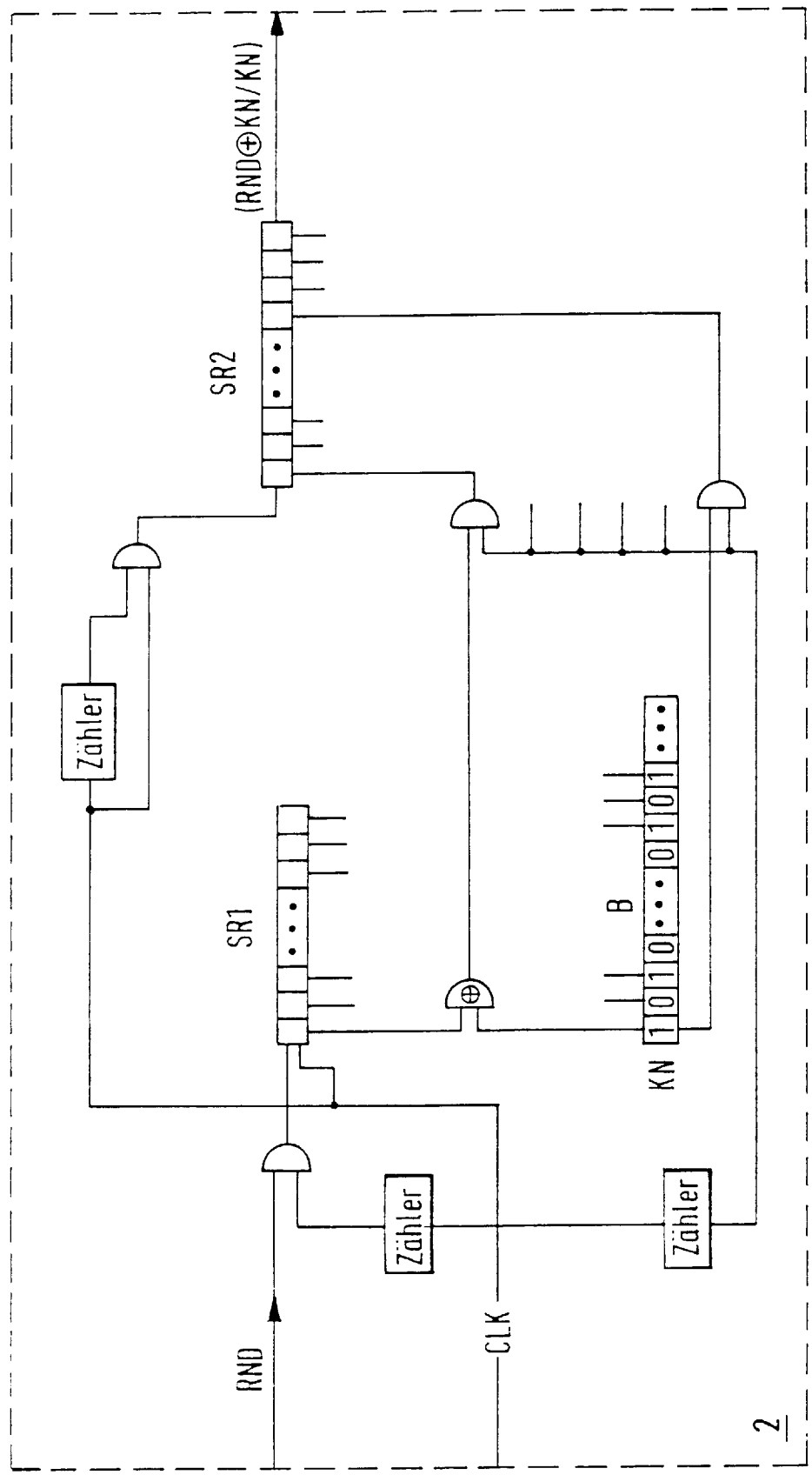
FIG. 11 shows a further embodiment of a special circuit of the data carrier.

FIG. 11 shows a further embodiment of special additional circuit 2 of a data carrier. In this embodiment random number RND transmitted by the external device is transmitted to first shift register SR1, data carrier identification KN being contained in register B. The data carrier identification can consist e.g. of two parts, the second part being a negation of the bit sequences of the first part. In synchronism to the clock, random number RND is then combined by exclusive-OR with the identification, e.g. serial number. When combination is completed, which is ascertained by means of suitable counters, the result of combination as well as the identification are passed on to the second shift register in synchronism to the clock and transmitted back to the external device. This preferably takes place within time domain $t_2$.

The above statements show that the identification contained in special circuit 2 of data carrier 1 is essential for authenticity testing of the data carrier. If it is a data carrier-specific identification for example, another specificity can be simulated by changing the identification For this reason it is especially important that the identification of data carrier 1 cannot be readily falsified.

Figure 12:
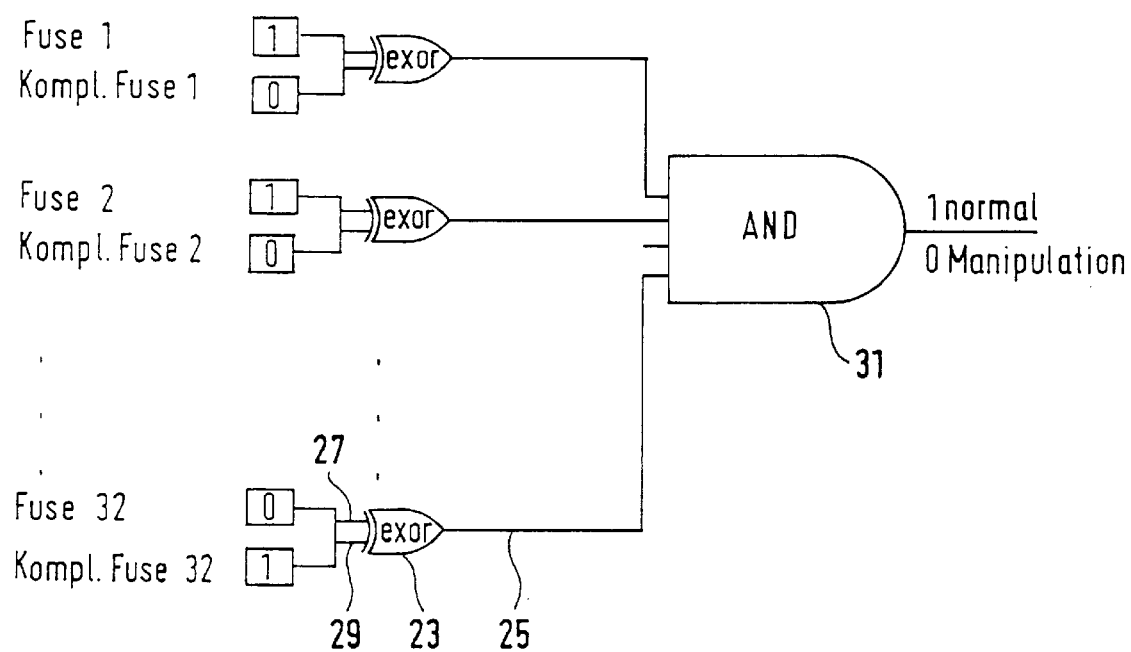
FIG. 12 shows a part of the special circuit.

If the data carrier identification is realized for example as a hardware identification by firing fuses (see also statements on FIG. 9), the identification can be protected from falsification by using a circuit shown in FIG. 12 which is part of special circuit 2 (see FIG. 9). FIG. 12 indicates 32 fuses which are either fired, like fuses 1 and 2, or unfired, like fuse 32. A fired fuse has a logical 1 associated therewith and an unfired fuse a logical 0. Fuses 1 to 32 represent the data carrier identification. Each individual fuse 1 to 32 has associated therewith a complementary fuse which is in the complementary state to the associated fuse (i.e. the complementary fuse of a fired fuse is unfired and vice versa). Complementary fuse 1 associated with fuse 1 is accordingly unfired since fuse 1 shown is fired. The same holds for complementary fuse 2 associated with fuse 2. In contrast, complementary fuse 32 is fired in the example according to FIG. 12 since fuse 32 shown is unfired.

Exclusive-OR gates 23 shown in FIG. 12 now check whether the complementary fuse associated with a fuse is really in the complementary state. Gate 23 indicates a logical 1 at its output 25 only if gate inputs 27 and 29 are set in complementary fashion, inputs 27 and 29 corresponding to the logical states of a fuse and the complementary fuse associated.

Finally AND gate 31 checks whether a logical 1 is available at all outputs of exclusive-OR gates 23 which are routed as inputs to AND gate 31. In this case the output of AND gate 31 indicates a logical 1, otherwise a logical 0. Exactly when AND gate 31 indicates a logical 1 it is thus ensured that the complementary fuse associated with each fuse is in its proper state. Special circuit 2 of the data carrier is designed so that the identification can be used for testing the authenticity of the data carrier only if it is genuine, i.e. if a logical 1 is available at the output of AND gate 31.

If the identification of data carrier 1 is to be falsified with intent to defraud, the states of fuses 1 to 32 which define the identification must be put at least partly in another state. With the circuit shown in FIG. 12 fuse 32 could e.g. be fired to falsify the identification, so that it would show the state logical 1. In this case the firing of complementary fuse 32 would have to be undone, however, so that it shows the state logical 0 and exclusive-OR gate 23 associated with fuse 32 and complementary fuse 32 indicates a logical 1 at output 25 again. If the firing of complementary fuse 32 cannot be undone, exclusive-OR gate 23 indicates a logical 0 at output 25 and AND gate 31 also does at its output, thus showing manipulation of the identification.

It is possible to form fuses in such a way that firing cannot be undone with justifiable effort, so that the identification of special circuit 2 and thus of data carrier 1 is protected very well from falsification done with intent to defraud.

The above statements relate mainly to testing of the authenticity feature of data carrier 1 by external device 5. The authenticity feature is formed as a separate hard-wired circuit on the integrated circuit of the data carrier. If the authenticity feature can be checked positively by external device 5 this proves that data carrier 1 is an intrasystem authentic data carrier. For most applications of data carriers it is furthermore important to ascertain whether certain data contained in the integrated circuit of the data carrier have been falsified. Such a check of data contained in the integrated circuit of data carrier 1 can also be done in especially advantageous fashion with the authenticity feature contained in special circuit 2, as explained by way of example in FIG. 13.

Figure 13:
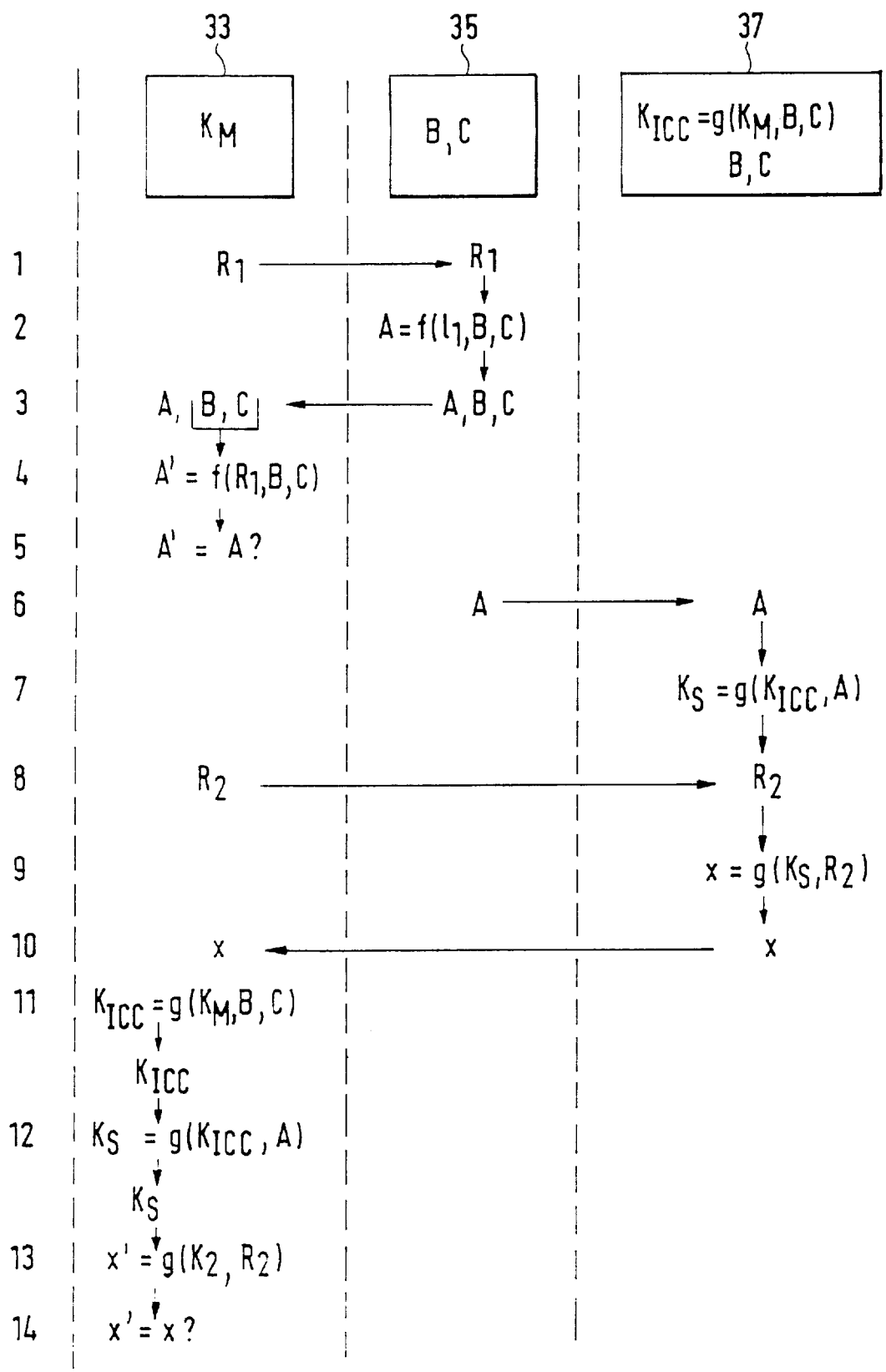
FIGS. 13 and 14 show flow charts for testing the authenticity feature of the data carrier.

The left column of FIG. 13 relates to external device 5 and shows field 33 containing the variables stored in external device 5 for carrying out the arithmetic operations described below. This is in particular master key $K_M$. Furthermore the left column of FIG. 13 contains all arithmetic operations performed in the external device.

The middle column of FIG. 13 relates to special circuit 2 of data carrier 1 (see also FIG. 6) and field 35 contains the variables stored in special circuit 2 for carrying out the arithmetic operations explained below. These are in particular data B and C, information B being for example a group number and information C for example a card number or other identification of the data carrier. Furthermore the middle column of FIG. 13 contains those arithmetic operations performed by special circuit 2.

The right column of FIG. 13 relates to microcontroller 3 of data carrier 1 (see also FIG. 6) and contains in field 37 those variables stored in microcontroller 3 for carrying out the arithmetic operations in microcontroller 3 as explained below. This is in particular key $K_{ICC}$ associated with the data carrier, which is a function of master key $K_M$ and data B and C. Key $K_{ICC}$ can already be stored in microcontroller 3 during production of data carrier 1.

Upon communication between external device 5 and data carrier 1 the authenticity feature of data carrier 1 is first checked, as explained several times above. For this purpose random number $R_1$ generated in external circuit 5 is first transmitted by external device 5 to special circuit 2 (see step 1, the steps being shown on the far left in FIG. 13). In the special circuit random number $R_1$ is combined logically with data B and C to form result A (see step 2). Data A, B and C are transmitted in step 3 from special circuit 2 to external device 5. Then transmitted data B and C are logically combined in external device 5 with random number $R_1$ stored there to form result A' (see step 4). In step 5 information A' is compared with information A transmitted by special circuit 2. If the two match it is ensured that data carrier 1 is an authentic intrasystem data carrier since the authenticity feature was checked positively bv the external device.

In step 6 information A calculated in special circuit 2 is transmitted to microcontroller 3 of data carrier 1 (see also FIG. 6). In microcontroller 3 function g is applied to information A using key $K_{ICC}$ and the result is key $K_S$ valid for this specific communication (see step 7; generated random number $R_1$ enters key $K_S$ via information A so that key $K_S$ actually varies from communication to communication).

External device 5 then transmits random number $R_2$ generated there to microcontroller 3 of data carrier 1 (see step 8). In microcontroller 3 the function g is applied to random number $R_2$ using key $K_S$ so that result x arises (see step 9). Result x is transmitted by microcontroller 3 to external device 5 (see step 10).

In the external device data carrier key $K_{ICC}$ is calculated from data B and C transmitted in step 3 with the help of master key $K_M$ stored in device 5 (see step 11). Calculated data carrier key $K_{ICC}$ can now be used to calculate current key $K_S$ from information A which was likewise transmitted to the external device in step 3 (see step 12). Finally information x' can be calculated from generated random number $R_2$ using key $K_S$ (see step 13), said information finally being compared there with information x transmitted by microcontroller 3 (see step 14).

If data x' and x match it is considered proven for external device 5 that special circuit 2 of data carrier 1 can communicate with microcontroller 3 of data carrier 1, since microcontroller 3 of data carrier 1 can calculate information x correctly only if correct information A was previously transmitted to microcontroller 3 by special circuit 2 in step 6. It is thus impossible to provide an inauthentic and extrasystem data carrier subsequently with a special circuit not connected to the microcontroller of the data carrier.

Furthermore it is considered proven for external device 5 that special circuit 2 and microcontroller 3 of data carrier 1 belong together, since only if special circuit 2 and microcontroller 3 belong together does microcontroller 3 contain the same data B and C as special circuit 2 and corresponding data carrier key $K_{ICC}$. Only in this case can the same information x be calculated in microcontroller 3 as in external device 5.

Because of this proof that special circuit 2 and microcontroller 3 belong together by external device 5 it is thus impossible to provide a data carrier which is basically inauthentic and extrasystem with special circuit 2 subsequently with intent to defraud and thus simulate the authenticity and system affiliation of data carrier 1.

Furthermore it is impossible to falsify data B and C in microcontroller 3 of an authentic intrasystem data carrier with intent to defraud. On one hand, data carrier key $K_{ICC}$ would also have to be adapted accordingly since key $K_{ICC}$ could be calculated any time from data B and C stored in microcontroller 3 in external device 5 and compared with stored key $K_{ICC}$. Such adaptation is impossible, however, since a defrauder does not have master key $K_M$. On the other hand, data B and C in special circuit 2 would also have to be changed accordingly, since otherwise different information x would be calculated in external device 5 and microcontroller 3. But data B and C of special circuit 2 can be protected well from falsification, as described e.g. in connection with FIG. 12.

Data B and C can be e.g. a group number and an individual chip number, or else personal data of the card owner, such as name and account number, etc. The test routines explained above can obviously also be performed if one uses e.g. only data B or data other than data B and C.

Figure 14:
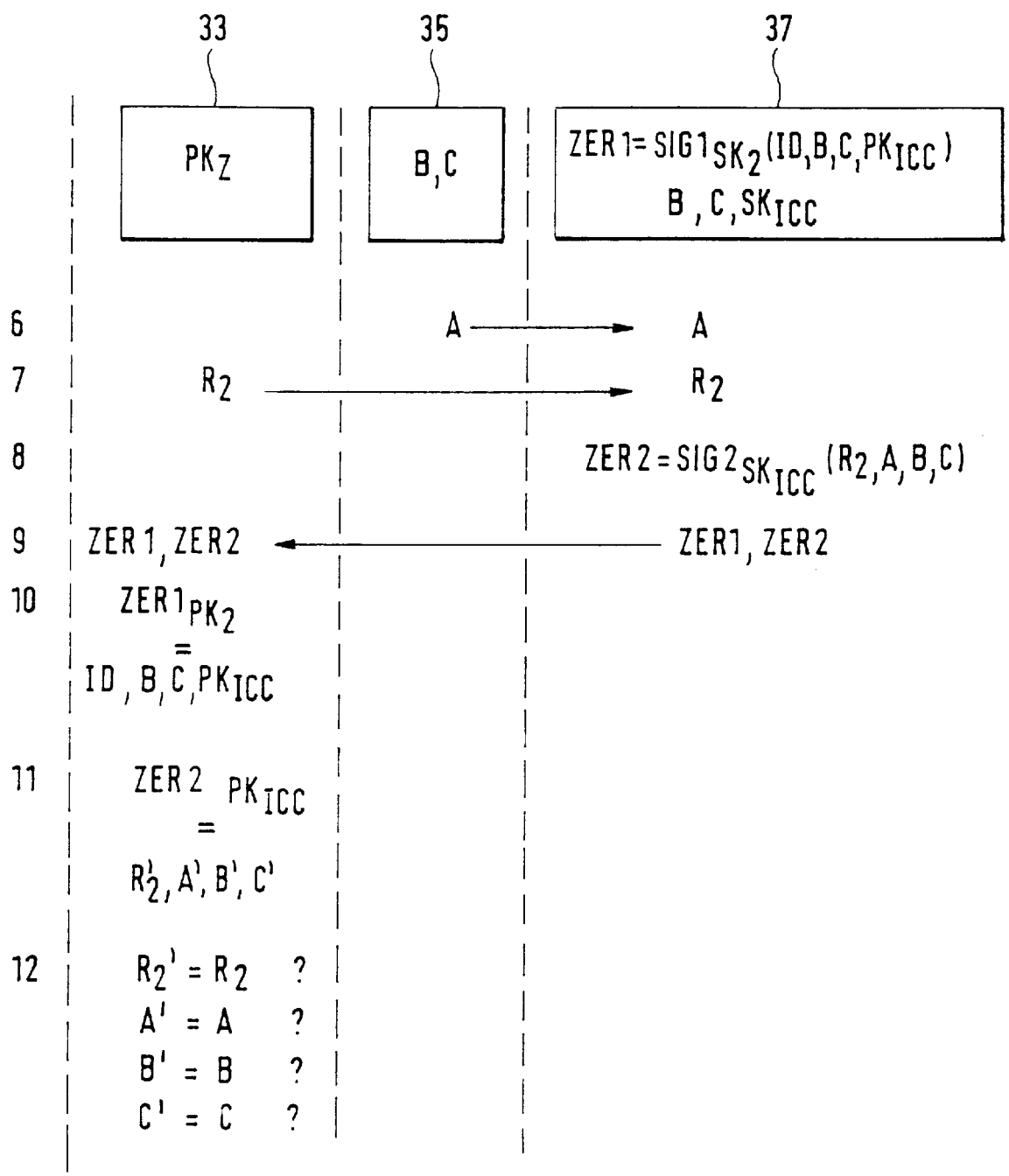

FIG. 14 shows how to prove that special circuit 2 and microcontroller 3 of data carrier 1 belong together using an asymmetrical encoding algorithm. FIG. 14 is constructed schematically just like FIG. 13, i.e. fields 33, 35 and 37 state the information stored in the corresponding components. Furthermore the testing of the authenticity feature of data carrier 1 is performed by external device 5 just as explained above in connection with steps 1 to 5 of FIG. 13. This will accordingly not be discussed again now.

After the authenticity feature of data carrier 1 is tested, special circuit 2 transmits information A to microcontroller 3 of data carrier 1 (cf. also FIG. 6) and in step 7 random number $R_2$ generated in external device 5. In step 8 certificate ZER2 is formed in microcontroller 3 from random number $R_2$ and data A, B and C using secret key $SK_{ICC}$ of data carrier 1. Certificate ZER2 is transmitted along with certificate ZER1 stored in microcontroller 3 to external device 5 (see step 9). Identity ID, data B and C and public key $PK_{ICC}$ of the data carrier are calculated from certificate ZER1 using public key $PK_Z$ of institute Z (see step 10). Then random number R2' and information A', B' and C' are calculated from certificate ZER2 using public key $PK_{ICC}$ of the data carrier just obtained (see step 11). Finally, in step 12 random number R2' just obtained is compared with random number R2 generated in the external device, and data A, B and C just obtained with data A, B and C transmitted in step 3 (see also FIG. 13).

If comparison is positive it is considered proven that special circuit 2 is in a position to communicate with microcontroller 3 (see step 6) and it is also considered proven that special circuit 2 and microcontroller 3 belong together. Otherwise the data compared in step 12 would not match, since different data B and C would then be stored in special circuit 2 and microcontroller 3 of data carrier 1.

It is further considered proven that data B and C stored in the microcontroller have not been falsified, since this information would otherwise no longer match data B and C stored in certificate ZER1. These data are tested for agreement in step 12 so that a forgery would be noticed. Furthermore these data would also no longer match data B and C stored in special circuit 2, which is likewise tested in step 12. Even if an asymmetrical encoding method is used data B and C are thus protected very well from falsification.

The operations mentioned in connection with FIGS. 13 and 14 and performed in external device 5 can preferably be performed by safety module 11, as described in connection with FIGS. 6 to 8.

We claim:

1. A method for testing the authenticity of a data carrier having at least an integrated circuit with memory units and logic units and exchanging data with an external device via a data line, the data carrier receiving the operating and control signals necessary for operation from the external device, characterized by the steps of:

transmitting and/or receiving data during a power-up sequence defined according to a protocol, via a separate, hard-wired circuit, and using the transmission and/or reception of data to test the authenticity of the data carrier, wherein the first transmission or reception of data used for authenticity testing is completed within a defined time domain of the power-up sequence in which the data line has no state defined by the protocol.

2. The method of claim 1, characterized in that the power-up sequence takes place according to the standardized protocol ISO/IEC 7816-3, the first transmission or reception of data being completed within time domain $t_2$ defined by the protocol.

3. The method of claim 2, characterized in that the data are transmitted by the external device and received by the data carrier within time domain $t_2$, and the received data are likewise transmitted back to the external device by the data carrier within $t_2$ and/or in the answer-to-reset signal of the data carrier defined by the protocol.

4. The method of claim 3, characterized in that the data received from the external device are combined by the data carrier with an identification of the data carrier, and the result of combination is transmitted back to the external device within time domain $t_2$ or in the answer-to-reset signal.

5. The method of claim 4, characterized in that the result of combination with the identification of the data carrier is transmitted by the latter the external device for authenticity testing.

6. The method of claim 4, characterized in that the data transmitted by the external device constitute a random number generated by the latter which is combined by an exclusive-OR operation with the identification of the data carrier by the latter, or a polynomial modulo division of the random number with the identification as the divisor polynomial is performed by the data carrier.

7. The method of claim 3, characterized in that the data received from the external device are combined with a data carrier identification by the special circuit of the data carrier, the result of combination (A) is transmitted back to the external device within time domain $t_2$ or in the answer-to-reset signal, and the result of combination (A) is transmitted additionally to the logic units of the integrated circuit of the data carrier.

8. The method of claim 7, characterized in that the result of logical combination (A) transmitted to the logic unit is transmitted by the logic unit to the external device and tested in the external device for a predetermined relation with the result (A) transmitted by the special circuit to the external device.

9. The method of claim 7, characterized in that the result of logical combination (A) is logically combined with further data in the logic unit of the data carrier to form a result (x), and the result of logical combination (x) is transmitted to the external device, and the result (A) obtained from the special circuit is logically combined with further data in the external device to form a result (x'), and the results (x) and (x') are tested in the external device for a predetermined relation, it being considered proven that the result (A) was transmitted by the special circuit to the logic units of the data carrier correctly and logically combined there correctly if the predetermined relation can be checked positively.

10. The method of claim 9, characterized in that the external device transmits data to the logic unit of the data carrier which are logically combined with the result (A) there to form the result (x), and the same logical combination is performed in the external device as in the logic unit of the data carrier which leads to the result (x'), and the results (x) and (x') are tested for a match in the external device.

11. The method of claim 8, characterized in that the result (A) is logically combined in the logic unit of the data carrier with data stored in the memory units of the data carrier to form the result (x), and the special circuit of the data carrier transmits data to the external device, and the result (A) is combined in the external device with the data transmitted additionally by the special circuit to form the result (x'), and the result (x) transmitted by the logic unit is checked in the external device for a predetermined relation with the result (x') calculated there, it being considered proven that the data stored in the data carrier memory units fulfill a predetermined relation to the data stored in the special circuit if the predetermined relation can be checked positively.

12. The method of claim 2, characterized in that the data carrier transmits to the external device within the time domain $t_2$ an identification of the data carrier which is then evaluated by the external device for testing the authenticity of the data carrier.

13. The method of claim 12, characterized in that the data carrier identification is combined by the data carrier with a random number generated by the data carrier before being transmitted to the external device, and the result of this combination is transmitted to the external device for testing the authenticity of the data carrier.

14. The method of one of claim 1, characterized in that the data used for authenticity testing are transmitted in synchronism with a clock signal transmitted by the external device to the data carrier.

15. The method of claim 14, characterized in that the data transmission upon authenticity testing takes place in synchronism with a multiple of the external clocking rate.

16. A data carrier assembly including a data carrier having at least an integrated circuit with memory units and logic units and exchanging data with an external device via a data line, the data carrier receiving the operating and control signals necessary for operation of the data carrier from the external device and the external device having access for reading and/or writing at least to partial areas of the memory units of the data carrier, characterized in that the integrated circuit additionally has a separate hard-wired circuit for transmitting and/or receiving data during a power-up sequence defined according to a protocol, which is used for authenticity testing, the separate circuit performing the first transmission or reception of data used for authenticity testing independently of the logic units and memory units of the data carrier within a defined time domain of the power-up sequence in which the data line has no state defined by the protocol.

17. The data carrier assembly of claim 16, characterized in that the separate circuit has an identification for the data carrier realized in hardware.

18. The data carrier assembly of claim 17, characterized in that the identification for the data carrier is realized by fuses, at least some of the fuses being fired and each individual fuse of the identification having associated therewith a complementary fuse which is in the complementary state to the fuse associated therewith.

19. The data carrier assembly of claim 18, characterized in that the special separate circuit has a circuit or testing whether the complementary fuse associated with each fuse is in the proper state, and the data carrier identification is only readable if all fuses and the fuses associated therewith are in the proper state.

20. The data carrier assembly of claim 17, characterized in that the separate circuit of the data carrier transmits the data carrier identification to the external device within the time domain $t_2$ defined by the protocol ISO/IEC 7816-3.

21. The data carrier assembly of claim 17, characterized in that the separate circuit of the data carrier generates a random number and combines it with the data carrier identification.

22. The data carrier assembly of claim 17, characterized in that the separate circuit of the data carrier combines a random number received from the external device with the data carrier identification.

23. The data carrier assembly of claim 16, characterized in that the external device has a microprocessor unit and a safety module, the safety module being drivable by the microprocessor unit, and the method of claims 1 to 15 for testing the authenticity of the data carrier is to be carried out with the safety module.

24. The data carrier assembly of claim 23, characterized in that the safety module is connected directly with the special circuit of the data carrier, and data are interchangeable between the safety module and the special circuit directly and bidirectionally.

25. The data carrier assembly of claim 22, characterized in that the safety module is connected directly with the logic units of the data carrier, and data are interchangeable between the safety module and the logic units directly and bidirectionally.

26. The data carrier assembly of claim 22, characterized in that she safety module is a chip card to be plugged in an outlet in the external device.

* * * * *